Patented Dec. 17, 1940

2,225,318

UNITED STATES PATENT OFFICE 2,225,318

LUBRICATING COMPOSITION

Arnold J. Morway, Clark Township, Union County, and Floyd L. Miller, Roselle Park, N. J., assignors to Standard Oil Development Company, a corporation of Delaware No Drawing. Application August 26, 1939, Serial No. 292,068

8 Claims. (Cl. 252—32)

This invention relates to high molecular weight halogenated organic compounds and methods of preparing same. More particularly, it relates to the halogenation of high molecular weight hydrocarbon polymers such as those produced by the polymerization of isobutylene at low temperature, generally below 0° C. and preferably as low as —10°, —20° C., or even —80° C., in the presence of boron fluoride or other halide polymerizing catalyst effective at such low temperature.

This application is a continuation-in-part of application Serial No. 170,120 filed October 20, 1937, Pat. No. 2,181,144, which is a continuation-in-part of application Serial No. 749,072 filed October 19, 1934.

It has been discovered that such polymers, which may range from 1,000 or so up to 15,000, 20,000 or even 250,000 or more in molecular weight (determined by the viscosity method described in Staudinger's Book, "Die Hochmolekularen Organischem Verbindungen", H. Staudinger Berlin 1932 Verlag Von Julius Stringer, page 56), are very stable and relatively inert chemical compounds, being substantially completely saturated with respect to hydrogen and having a very low iodine number, e. g. about 7 or less. Generally, the higher the molecular weight the more chemically inert are these polymers. For instance, they are substantially not affected by sulfuric acid and they are very resistant to oxidation, sulfurization, and many other chemical treatments. They differ from rubber which is quite unsaturated in that they cannot be vulcanized by sulfur while rubber can, and in that they are soluble in all proportions in petroleum hydrocarbons, such as naphtha, kerosene and lubricating oils, causing an increase in the true viscosity and viscosity index thereof, while rubber forms a gel (merely swells) in those liquids.

Other similar materials which may be treated according to this invention include any similar substantially saturated high molecular weight polymers which may be considered to have a chemical structure corresponding to that of a very long chain of carbon atoms containing occasional side chains of alkyl groups, such as methyl, ethyl, etc. Besides isobutylene, other iso-olefines, such as iso-amylene, especially methyl-2 butene-1, may be polymerized at low temperature, to produce high molecular weight polymers for use as raw material for this invention. Although the above type of material is preferred, other materials believed to have a substantially similar chemical structure but formed in other ways may be used in some instances, for example, "hydro-rubber" (which is produced by destructive hydrogenation of rubber and is entirely different from the parent substance in its properties and behavior).

According to the present invention, high molecular weight halogenated compounds are prepared by contacting a halogen with a solution of a high molecular weight hydrocarbon of the structure described. The solvent to be used may be any one which is non-reactive with the halogen being used or which, if reactive therewith, will not cause any harmful effect on the high molecular weight product. Carbon tetrachloride has been found very suitable. Other solvents, such as sulfur halides, etc., may be used. The solvents must be sufficiently fluid that a solution of the high molecular weight hydrocarbon therein will not be too viscous for treatment with the halogen under the conditions of treatment. The halogen to be used may be any one of the four, i. e., fluorine, chlorine, bromine or iodine, although chlorine is the cheapest and most practical.

The halogenation may be carried out at room temperature or elevated temperature, such as up to 50° or 100° C., but should not be too high inasmuch as halogenation at an excessively high temperature will cause excessive breakdown of the molecular weight of the product. The halogenation may be carried out at atmospheric pressure or considerably higher pressures, such as 5 to 50 or 100 atmospheres or more, especially when carrying out the reaction at low temperature.

The halogenation is preferably carried out in the presence of strong light such as ultraviolet light or direct sunlight, although it will proceed at a slower rate in diffused light and even to a slight extent in total darkness at ordinary temperature and pressure and will proceed even quite rapidly at more elevated temperature and pressure even in the absence of light. One effect of carrying out the halogenation in the presence of light and particularly at low temperatures such as 0° C. or —20° C., —40° C., etc. is that there is less tendency for the polymer to be broken down in molecular weight during the halogenation. The conditions to be used during halogenation will therefore depend to some extent upon the type of product desired for incorporation to the lubricating oil. For instance, if it is desired to use a chlorinated polymer having a high thickening and viscosity index improving property, it is preferable to carry out the chlorination in the presence of strong light at low temperature and of course not carry the chlorination beyond the point of solubility in the lubricating oil base stock to be used. (The limit is about 10% to 12% of chlorine in polymers having a molecular weight of 50,000 or 100,000 or more which have not been seriously depolymerized during chlorination.) On the other hand, if it is desired primarily to have a chlorinated polymer having a high chlorine content such as 20% or in some cases even 30% or higher, it is preferable either to chlorinate a polymer having a molecular weight of 50,000 or more in the dark by the aid of heat and pressure, or to use a polymer having a substantially lower molecular weight, such as 1,000 to 20,000 or 30,000, as the starting material and carry out the chlorination either with or without light.

Iodine may be used as a catalyst. If desired, the halogenation may be carried out in the presence of peroxides, e. g. benzoyl peroxide, to direct the halogen atoms preferentially to the alpha (end) carbon atoms in hydrocarbon molecules. The percent of halogen incorporated depends upon the duration of the treatment. Generally, it is desirable to incorporate from 5 or 10% to 20% of halogen, although as little as 1% and as much as 50% may be incorporated if desired. It is possible to chlorinate polyisobutylene to even greater chlorine content such as 60, 65, 70 or even 75% chlorine but such products are not as soluble in petroleum lubricating oil fractions as are the chlorinated polymers containing 10% or less of chlorine.

The chlorinated isobutylene polymers having a low chlorine content (15 to 25% or lower) and those having a high chlorine content (substantially above 50%) are both substantially more soluble in aliphatic petroleum hydrocarbon liquids than are the polymers having intermediate chlorine content. The polymers of all degrees of chlorination are quite readily soluble in petroleum fractions containing aromatic compounds, such as sulfur dioxide extracts of petroleum distillates. Incorporation of polymers in non-aromatic petroleum fractions may be facilitated by the use of mutual solvents such as aromatic hydrocarbons, chlorinated low molecular weight aliphatic hydrocarbons, ketones or esters.

Various methods may be used for treating the high molecular weight hydrocarbon with the halogen. For example, chlorine may be bubbled through a carbon tetrachloride solution of the high molecular weight polymer or chlorine may be subjected to a countercurrent spray of a solution of the polymer. Another alternative is to carry out the halogenation treatment in the presence of bases, e. g., calcium or magnesium oxides or carbonates, sodium carbonate or bicarbonate, etc., or over water containing an insoluble carbonate, such as calcium carbonate or magnesium carbonate, for the purpose of absorbing hydrogen chloride liberated by the reaction.

If desired, instead of first preparing the polymer in relatively pure form and then dissolving it in a suitable solvent, such as carbon tetrachloride, and passing chlorine through this solution, the original polymerization of isobutylene, for example, may be carried out in the presence of carbon tetrachloride or other solvent which will be suitable for the halogenation and then as soon as the polymerization process is completed the solution of the high molecular weight polymer may be treated immediately with a desired halogen, thereby avoiding the removal of the solvent used during the polymerization step and subsequent redissolving of the polymer in a solvent for the halogenation step.

If desired, after the halogenation has been completed, the solution may be blown with air or inert gas, such as nitrogen or hydrogen, at a slightly elevated temperature, but preferably not above 100° C., in order to remove hydrogen chloride. Any traces still remaining may be removed by further blowing the liquid with ammonia, or other volatile amine, alone or mixed with air or inert gas, preferably at room temperature or perhaps up to 40 or 50° C.

As an alternative, the product may be washed one or more times with dilute alkali, such as caustic soda, in order to remove any free hydrogen chloride remaining as a result of the halogen treatment. It may also, under some circumstances, be desirable to heat the chlorinated polymer at a low temperature with a basic material, such as alcoholic potash, aqueous calcium hydroxide, sodium carbonate solution, sodium bicarbonate, etc., to remove one or possibly more halogen atoms and thereby produce a further stabilized product. A difficultly volatile basic compound, preferably an aromatic amine such as monoethyl aniline or methyl naphthyl amine, may be added as a stabilizer (in proportions of 0.1 to 1% or so) to the finished halogenated hydrocarbon.

The products prepared according to the present invention are high molecular weight halogenated hydrocarbons and their physical properties depend upon the nature of the original material treated and the duration and type of treatment. These products may be used for a wide variety of purposes; for instance, they may be condensed with aromatic hydrocarbons in the presence of aluminum chloride, boron fluoride or other condensing agents, to produce materials suitable as lubricants or blending agents in lubricants, such as pour depressors, or they may be used for any other type of condensation reactions in which halogenated aliphatic hydrocarbons are used as one of the reactants.

These halogenated products, which can be prepared according to this invention, may frequently serve to advantage as solvents or plasticizers. For delustering artificial silk, these high molecular weight halogenated polymers may be mixed with an inert organic material of an oily or waxy nature, such as petroleum oil, petroleum jelly and paraffin wax, and the mixture added to solutions of artificial silk to be spun.

Many other uses will no doubt occur to those skilled in the art and it is an object of the present invention to claim broadly these high molecular weight halogenated products prepared from substantially saturated organic compounds having a structure represented by a long straight chain of carbon atoms with a plurality of alkyl side chains and containing a substantial proportion of halogen atoms incorporated according to this invention regardless of the purpose for which they are to be used.

The invention will be illustrated from the following examples:

Example 1

Chlorine gas is diffused at room temperature in ordinary diffused light, through a solution of carbon tetrachloride containing, dissolved therein, about 20% of a hydrocarbon polymer having a molecular weight of about 8,000 and prepared by polymerizing isobutylene at a temperature of −20° C. with boron fluoride as catalyst. When about 20% of chlorine has been combined chemically with the polymer the chlorination is stopped and the product is washed with water and the carbon tetrachloride removed by distillation.

The product of this experiment differs from chlorinated rubber in that (1) rubber containing small amounts of chlorine is unstable, while the present product is relatively stable, (2) no solid chlorinated products were obtained as in the chlorination of rubber, and (3) the present product is miscible with paraffin wax while chlorinated rubber is not.

The chlorinated polymer, for example, may also be used in compounding high viscosity index extreme pressure lubricants either alone or in conjunction with sulfur or sulfur compounds or other materials known to the art in preparing extreme pressure lubricants.

The saturated high molecular weight polymers may also be mixed with wax, resins, mineral and vegetable oils, chloraromatics, esters, and the like, prior to or after halogenation. When blended in mineral oils, the chlorinated polymer may be used in conjunction with oxidation inhibiting amines, oiliness agents, thickeners, sludge dispersers, pour inhibitors, soaps, bright stocks, white oils, etc.

*Example 2*

When the isobutylene polymer is of a low molecular weight (around 3,000) the direct chlorination is effected by passing chlorine gas through the polymer in the presence of very small amounts of iodine to catalyze the reaction. In this example no solvent is present and the resulting product requires only a slight carbonate washing to remove any of the remaining HCl.

*Example 3*

Chlorine gas is passed under pressure through vents in the bottom of a tower packed with broken porcelain or spiral packing; when the tower has become saturated with the chlorine gas a solution of isobutylene polymer in carbon tetrachloride is sprayed in at the top of the tower passing down through the chlorine gas and being removed at the bottom of the tower and pumped back to the top of the same tower or other similar towers and the contact repeated until the chlorine content has reached the required amount.

The gaseous mixture removed at the top is scrubbed free of HCl by passing through solid caustic soda and again passed in at the bottom of the tower. The carbon tetrachloride solution of chlorinated isobutylene polymer is washed free of HCl by a slight carbonate washing and the carbon tetrachloride removed by distillation.

*Example 4*

150 grams of polymerized isobutylene (12,000 molecular weight) were dissolved in 850 grams of carbon tetrachloride by heating (120–140° F.) and stirring for 1½ hours. After the polymerized isobutylene was completely dissolved, the solution was transferred to a separatory flask and 0.5 gram of iodine added. Chlorine gas was passed through the solution at a slow rate at room temperature (75–80° F.) by means of a small alundum thimble attached to a glass tube and suspended close to the stopcock end of the separatory flask. Chlorine was passed through the solution for 5½ hours and then discontinued over night (about 16 hours). The following morning the chlorine was again passed through the solution for eight hours, and then again shut off. The chlorine saturated material was allowed to stand over the weekend (60 hours).

A small sample (200 grams) of the carbon tetrachloride solution of the chlorinated product was placed in a filter flask, and the carbon tetrachloride distilled off at 200–210° F. (water bath) under laboratory vacuum pressure, after which carbon dioxide was blown through.

The product was a heavy viscous material, similar to the original polymerized isobutylene and having a slight pink color due to iodine present. The product shown by analysis to contain 24% chlorine was found to be completely soluble in petroleum ether and mineral lubricating oil.

In the removal of traces of carbon tetrachloride from the washed solution of chlorinated isobutylene polymer in carbon tetrachloride, almost the total amount of solvent is removed by mere distillation, either atmospheric or under reduced pressure, the remaining traces of solvent being removed by dissolving the practically solvent-free chlorinated product in close cut naphtha with a boiling range close to the boiling point of carbon tetrachloride (76° C.) and redistilling.

*Example 5*

Gaseous chlorine is dissolved in carbon tetrachloride solution of polyisobutylene (about 55,000 average mol. wt.) (ca 5%) at room temperature until approximately 10% by weight of the latter has been absorbed. The viscous solution is allowed to flow down the wall of a cylindrical or conical vessel exposed to the radiation of a mercury vapor lamp (Uvirarc Type H–1) placed in the center. If the lamp is water jacketed, the rate of flow may be 5–8 cc. per second for complete reaction. The resultant solution is flashed to remove the major portion of the solvent and the chlorinated product precipitated by the addition of alcohol or acetone. The product is further purified by milling and pressing. This product is soluble in petroleum lubricating oil distillates.

*Example 6*

Polyisobutylene having a No. 6 tetralin number or a molecular weight of about 13,000 was chlorinated in ordinary diffused light of a laboratory in glass apparatus to a chlorine content of 23.7% and 2% of the resulting chlorinated polymer was dissolved in a commercial lubricating oil comprising essentially hydrogenated petroleum lubricating oil base stock having a viscosity index of about 90 and a viscosity of about 80 seconds Saybolt at 210° F. The chlorinated polymer effected a substantial increase in the viscosity of the lubricating oil and made a blend which was quite stable on standing and had an excellent color.

*Example 7*

To the lubricating composition prepared in Example 6, an addition of 7% of sulfur was incorporated and the resulting extreme pressure lubricant was found to contain 0.87% sulfur and 0.34% chlorine.

*Example 8*

Polyisobutylene having a molecular weight of about 20,000 was chlorinated to about 15% chlorine and it was added in several concentrations to a mineral lubrication oil base stock such as used in the preparation of greases. When the chlorinated polymer was present in 50% concentration, it was found to be soluble and the product was stringy. When the concentration of chlorinated polymer was reduced to 10%, the grease blend still showed fair stringiness and when tested for load-carrying capacity it was found to carry 15 weights full load on the Almen machine.

Example 9

A 4% solution of hydro-rubber having a molecular weight of about 10,000 was made in carbon tetrachloride. The solution was exposed to sunlight and chlorine gas was passed in through a bubbler at a temperature ranging from room temperature up to about 35° C. or 40° C. The chlorination was continued for 3 or 4 hours until the addition of a small amount of petroleum ether caused cloud formation. It was found that the product contained about 10% of chlorine and was soluble in mineral lubricating oil.

Example 10

A Coastal oil was heated and small pieces of polyisobutylene of about 40,000 average molecular weight chlorinated to 5% by weight were dissolved into the oil by continuous stirring until about 5% of the chlorinated polymer was introduced. The results of the tests made were as follows:

| Oil | Viscosity at 100° F. | Viscosity at 210° F. | Viscosity index |
|---|---|---|---|
| Coastal oil | 210 | 43.5 | 0 |
| Ditto+5% of chlorpolymer | 844 | 96.7 | 120 |

Hence it can be seen that by the addition of only 5% of the chlorpolymer, it was possible to convert a Coastal oil into an oil of a better grade than Pennsylvania with respect to viscosity index.

Example 11

Ten gms. of hydro-rubber were dissolved in 100 cc. of $CCl_4$. After standing overnight this was diluted with an additional 100 cc. of $CCl_4$ and chlorinated with a slow stream of chlorine in sunlight. Small samples were removed at intervals and diluted with petroleum ether. When addition of petroleum ether gave a turbid solution, the chlorination was stopped and the chlorinated product was recovered by precipitation with isopropyl alcohol and subsequent drying in a vacuum oven.

| Oil | Viscosity at 100° F. | Viscosity at 210° F. | Viscosity index |
|---|---|---|---|
| Coastal oil | 210 | 43.5 | 0 |
| Ditto+5% of chlorinated hydro-rubber | 2,240 | 195 | 120 |

The amount of polymer added to the lubricant is generally about 0.5 to 5% although amounts as low as 0.01% or as high as 10 or even 50% can be employed when conditions so require it.

The oil to which these halogenated polymers are added may be natural or synthetic oils of low or high molecular weight such as petroleum lubricating oils, fatty oils, or oils produced by the polymerization of olefins. Such oils may be waxy, dewaxed, treated by solvent extraction, acid, clay, or otherwise improved, residuals, pale oils or light distillates. It is preferred to employ an oil of about 35 to 500 Saybolt viscosity at 210° F.

Many of the above steps may be combined.

It is not intended that the invention be limited to any of the specific examples given nor to any theories of the operation of the invention but in the appended claims it is intended to claim all inherent novelty in the invention as broadly as the prior art permits.

We claim:

1. A lubricating composition comprising a lubricating oil base stock and a halogen derivative of a substantially saturated linear aliphatic hydrocarbon compound having a molecular weight above about 800 and containing at least 1% of halogen.

2. A lubricating composition comprising a mineral lubricating oil and chlorinated polyisobutylene.

3. A lubricating composition comprising a mineral lubricating oil and a chlorine derivative of a polyisobutylene of at least 800 molecular weight, containing at least 1% of chlorine.

4. A lubricating composition comprising a mineral lubricating oil and an oil-soluble chlorinated hydrocarbon product obtained by chlorinating polyisobutylene having a molecular weight of 800–500,000 to a chlorine content of about 1–15%.

5. A lubricating composition comprising a mineral lubricating oil and an oil-soluble chlorinated hydrocarbon product obtained by chlorinating polyisobutylene having a molecular weight of at least 50,000 under relatively non-depolymerizing conditions.

6. A lubricating composition comprising a mineral lubricating oil and a chlorine derivative of polyisobutylene containing more than 15% chlorine.

7. A lubricating composition comprising a mineral lubricating oil having a viscosity of 35–500 seconds Saybolt at 210° F. and dissolved therein 0.1% to 50% of chlorinated polyisobutylene.

8. A lubricating grease comprising a mineral lubricating oil base stock, metal soap, and a chlorine derivative of a substantially saturated linear type aliphatic hydrocarbon compound having a molecular weight above about 800.

ARNOLD J. MORWAY.
FLOYD L. MILLER.